(12) United States Patent
Mohammed-Fakir et al.

(10) Patent No.: US 6,752,592 B2
(45) Date of Patent: Jun. 22, 2004

(54) SUPPLEMENTAL SEAL FOR THE CHORDAL HINGE SEALS IN A GAS TURBINE

(75) Inventors: Abdul-Azeez Mohammed-Fakir, Schenectady, NY (US); Mahmut Faruk Aksit, Istanbul (TR); Ahmad Safi, Troy, NY (US); Srikanth Vedantam, Niskayuna, NY (US); Ning Fang, West Chester, OH (US)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 10/029,003

(22) Filed: Dec. 28, 2001

(65) Prior Publication Data

US 2003/0123979 A1 Jul. 3, 2003

(51) Int. Cl.[7] .................................... F01D 9/04
(52) U.S. Cl. .................. 415/139; 415/189; 415/191
(58) Field of Search .............................. 415/115, 116, 415/136, 138, 139, 173.7, 189, 190, 191, 209.1, 209.2, 209.3

(56) References Cited

U.S. PATENT DOCUMENTS

| | | |
|---|---|---|
| 3,893,786 A | 7/1975 | Rahnke et al. |
| 3,999,883 A | 12/1976 | Nordenson |
| 4,184,689 A | 1/1980 | Brodell et al. ............... 415/134 |
| 4,199,151 A | 4/1980 | Bartos |
| 4,336,943 A | 6/1982 | Chaplin |
| 4,477,086 A | 10/1984 | Feder et al. |
| 4,752,184 A | 6/1988 | Liang |
| 4,815,933 A | 3/1989 | Hansel et al. ................ 415/189 |
| 4,897,021 A | 1/1990 | Chaplin et al. |
| 5,092,735 A | 3/1992 | Katy et al. |
| 5,149,250 A | 9/1992 | Plemmons et al. ....... 415/209.3 |
| 5,158,305 A | 10/1992 | Halling |
| 5,271,714 A | 12/1993 | Shepherd et al. .......... 415/209.2 |
| 5,273,396 A | 12/1993 | Albrecht et al. |
| 5,343,694 A | 9/1994 | Toborg et al. |
| 5,372,476 A | 12/1994 | Hemmelgarn et al. ....... 415/135 |
| 5,716,052 A | 2/1998 | Swensen et al. |
| 5,807,072 A | 9/1998 | Payling |
| 5,819,854 A | 10/1998 | Doane et al. |
| 6,095,750 A | 8/2000 | Ross et al. ................... 415/189 |
| 6,164,656 A | 12/2000 | Frost |
| 6,237,921 B1 | 5/2001 | Liotta et al. |
| 6,287,091 B1 | 9/2001 | Svihla et al. |
| 6,364,606 B1 * | 4/2002 | Rice et al. ................... 415/189 |
| 6,402,466 B1 | 6/2002 | Burdgick |

FOREIGN PATENT DOCUMENTS

DE 38 39 843 A1 5/1990

\* cited by examiner

*Primary Examiner*—Edward K. Look
*Assistant Examiner*—Dwayne J. White
(74) *Attorney, Agent, or Firm*—Nixon & Vanderhye

(57) ABSTRACT

In a gas turbine having a chordal hinge seal between an inner rail of each nozzle segment and an annular axially facing sealing surface of a nozzle support ring, a supplemental seal is disposed between the support ring and inner bands of the nozzle segments on a lower pressure side of the chordal hinge seals. To minimize or prevent leakage flow across the chordal hinge seals, a generally U-shaped supplemental seal having reversely folded U-shaped marginal portions is received in a cavity formed in the axially extending sealing surface of the inner rail of the nozzle segment. At operating conditions, the marginal portions seal against the base of the cavity and the annular sealing surface of the nozzle support ring to prevent leakage flow past the chordal hinge seal from entering the hot gas path. To install the supplemental seal, the seal is first compressed and maintained in a compressed state by applying one or more wraps about the supplemental seal or an epoxy to secure the seal when compressed in the cavity. At operating temperatures, the retention means releases the seal to engage marginal portions against opposite sealing surfaces of the nozzle segment and support ring.

8 Claims, 8 Drawing Sheets

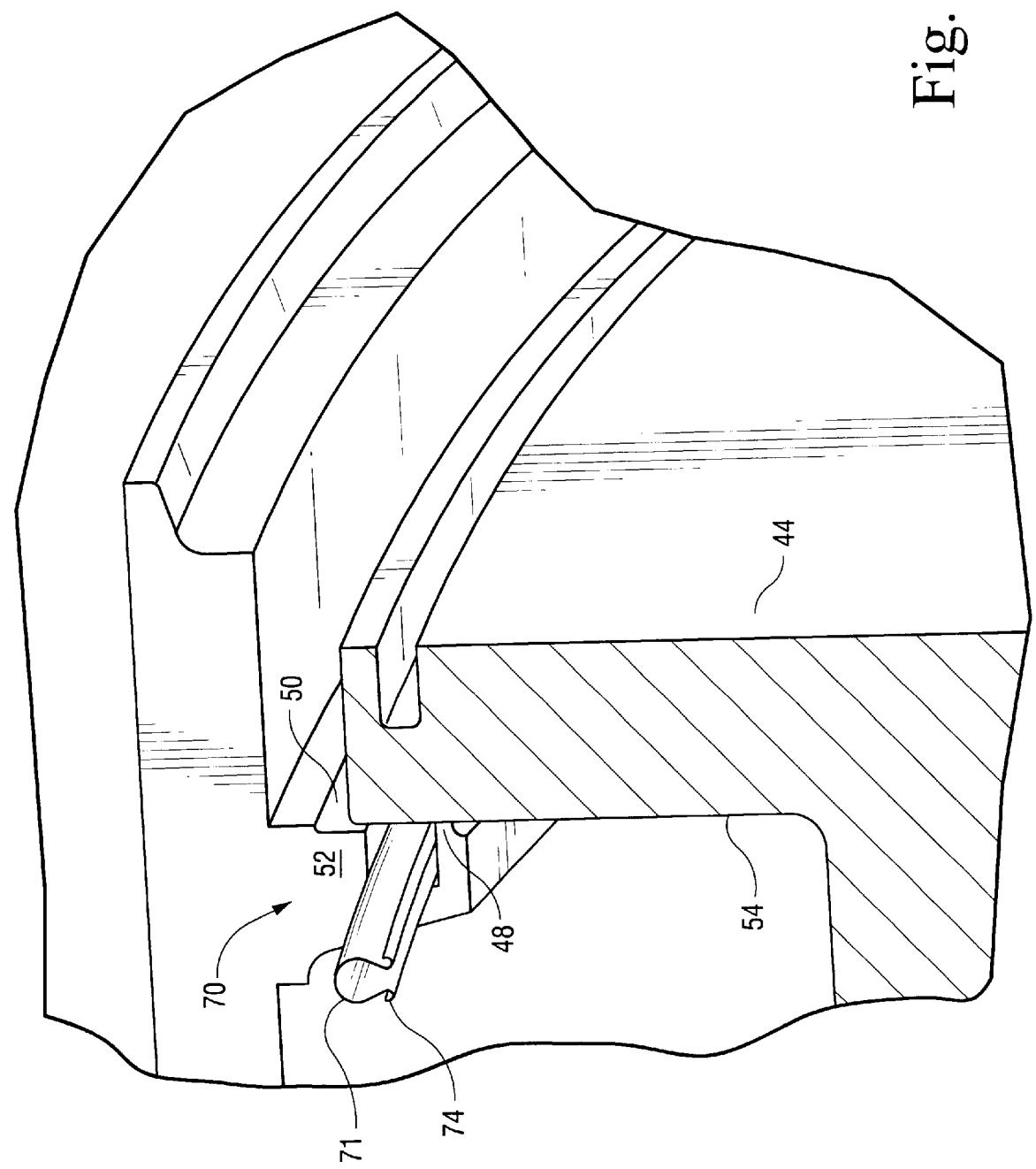

SUPPLEMENTAL SEAL FOR THE CHORDAL HINGE SEALS IN A GAS TURBINE

BACKGROUND OF THE INVENTION

The present invention relates to seals in a gas turbine for supplementing the chordal hinge seals between turbine nozzles and a turbine nozzle support ring and particularly relates to supplementary seals for substantially minimizing or eliminating leakage losses past the chordal hinge seals.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer band portions spaced radially from one another. Upon assembly of the nozzle segments, the stator vanes are circumferentially spaced from one another to form an annular array thereof between annular inner and outer bands. A nozzle retaining ring coupled to the outer band of the first-stage nozzles supports the first-stage nozzles in the gas flow path of the turbine. An annular nozzle support ring, preferably split at a horizontal midline, is engaged by the inner band and supports the first-stage nozzles against axial movement.

In an exemplary arrangement, eighteen cast segments are provided with two vanes per segment. The annular array of segments are sealed one to the other along adjoining circumferential edges by side seals. The side seals seal between a high pressure region radially inwardly of the inner band, i.e., compressor discharge air at high pressure, and the hot gases of combustion in the hot gas flow path which are at a lower pressure.

Chordal hinge seals are used to seal between the inner band of the first-stage nozzles and an axially facing surface of the nozzle support ring. Each chordal hinge seal includes an axial projection which extends linearly along a chord line of the inner band portion of each nozzle segment. Particularly, the chordal hinge seal extends along an inner rail of each segment and which rail extends radially inwardly of the inner band portion. The chordal hinge seal projection lies in sealing engagement with the axially opposite facing sealing surface of the nozzle support ring.

During operation and/or repair of the first-stage nozzle, it has been found that warpage can leave gaps between the chordal hinge seals and the sealing surface of the nozzle support ring. These gaps enable leakage past the chordal hinge seals from the high pressure area radially within the annular inner band into the hot gas flow path. That is, the chordal hinge seals are inadequate to prevent leakage flow as the chordal hinge seal projections lose contact with the sealing surface of the nozzle support ring. Consequently, there is a need for a supplemental seal at the interface of the first-stage nozzles and nozzle support ring to minimize or eliminate the leakage flow past the chordal hinge seals.

BRIEF DESCRIPTION OF THE INVENTION

In accordance with a preferred embodiment of the present invention, there is provided a supplemental seal between the first-stage nozzles and the nozzle support ring which eliminates or minimizes leakage past the chordal hinge seals. The supplemental seal includes a seal body which extends in an arcuate cavity in one of the axially opposed sealing surfaces of the nozzle support ring and nozzle segment radially outwardly of the chordal hinge seal. The seal body has preferably a first, generally U-shaped portion in cross-section, and a pair of reversely extending, generally U-shaped marginal portions in cross-section along opposite sides of the U-shaped portion. With the seal body disposed in the cavity and at turbine operating conditions, the marginal portions of the seal body lie in sealing engagement against an interior surface of the cavity, e.g., the base of the cavity, and the opposite opposed axially sealing surface whereby any leakage flow past the chordal hinge seal from the high pressure region to the low pressure region of the hot gas path is substantially eliminated.

In a particularly preferred form of the present invention, the supplemental seal is formed of sheet metal, preferably a pair of sheet metal plates secured, for example, by welding, to one another and bent into the aforementioned cross-sectional configuration. To install the supplemental seal, the seal is first placed in a compressed state and maintained in that compressed state during installation. To accomplish this, the seal may be wrapped by a material which, at turbine operating or near-operating conditions such as temperature, disintegrates, releasing the seal to expand in the cavity which, under preload, biases the marginal portions of the seal body against the sealing surfaces. The wrap may be formed of a Kevlar® 29 or may be formed of a high-strength plastic material, such as Lexan™ or Ultem™ clips to hold the seal in a compressed condition during installation. Alternatively, epoxy may be applied to the compressed seal to maintain the seal in the cavity in the compressed condition, the epoxy releasing the seal body at operating or near-operating turbine conditions for sealing engagement with the opposed sealing surfaces.

In a preferred embodiment according to the present invention, there is provided a gas turbine comprising a turbine nozzle support ring having a generally axially facing first surface, a turbine nozzle segment having at least one stator vane and including an inner band having a second surface in axial opposition to the first surface, one of the first and second surfaces defining a cavity opening generally axially toward another of the first and second surfaces and a flexible seal in the cavity including a seal body having a first, generally U-shaped portion in cross-section and a pair of reversely extending, generally U-shaped marginal portions in cross-section along opposite sides of the U-shaped portion, the marginal portions in sealing engagement with an interior surface of the cavity of one surface and another of the first and second surfaces, respectively.

In a further preferred embodiment according to the present invention, there is provided a turbine comprising a turbine nozzle support ring having a generally axially facing first surface, a plurality of turbine nozzle segments having an annular array of stator vanes and an annular second surface in axial opposition to the first surface, each of the segments including an axial extending projection for sealing engagement with the first surface forming a first seal therewith, one of the first and second surfaces having a cavity opening generally axially toward another of the first and second surfaces and at a location radially outwardly of the first seal and a flexible seal in the cavity including a seal body having a first, generally U-shaped portion in cross-section and a pair of reversely extending, generally U-shaped marginal portions in cross-section along opposite sides of the U-shaped portion, the marginal portions in sealing engagement with an interior surface of the cavity of one surface and another of the first and second surfaces, respectively.

BRIEF DESCRIPTION OF THE DRAWINGS

FIG. 9 is a fragmentary perspective view of the chordal hinge and supplementary seals between the nozzle segments and the support ring.

DETAILED DESCRIPTION OF THE INVENTION

Figure 1:
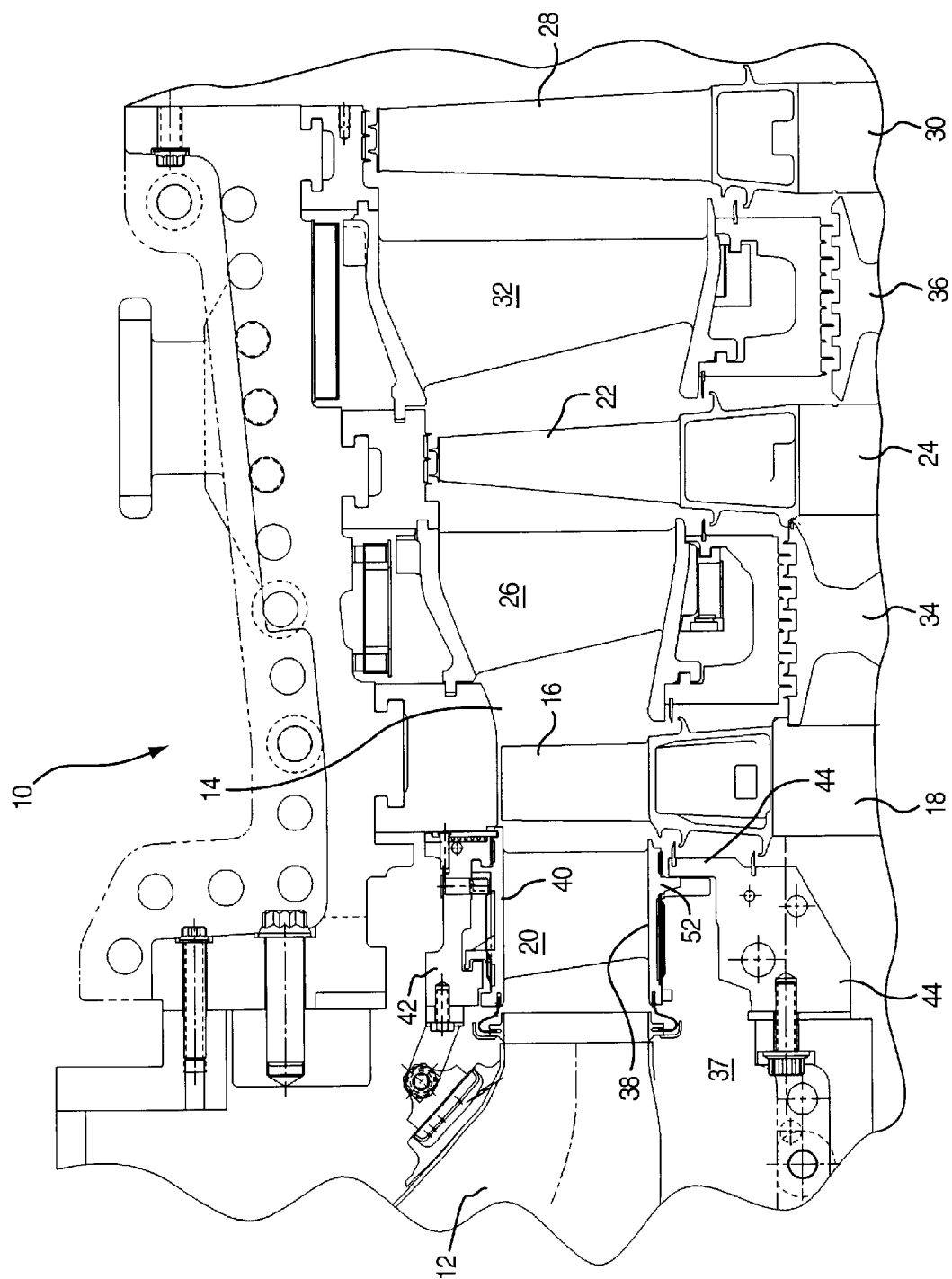
FIG. 1 is a fragmentary schematic side elevational view of a portion of a gas turbine.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaced stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. It will be appreciated that compressor discharge air is located in a region 37 disposed radially inwardly of the first stage and that such air in region 37 is at a higher pressure than the pressure of the hot gases flowing along the hot gas path 14.

Figure 2:
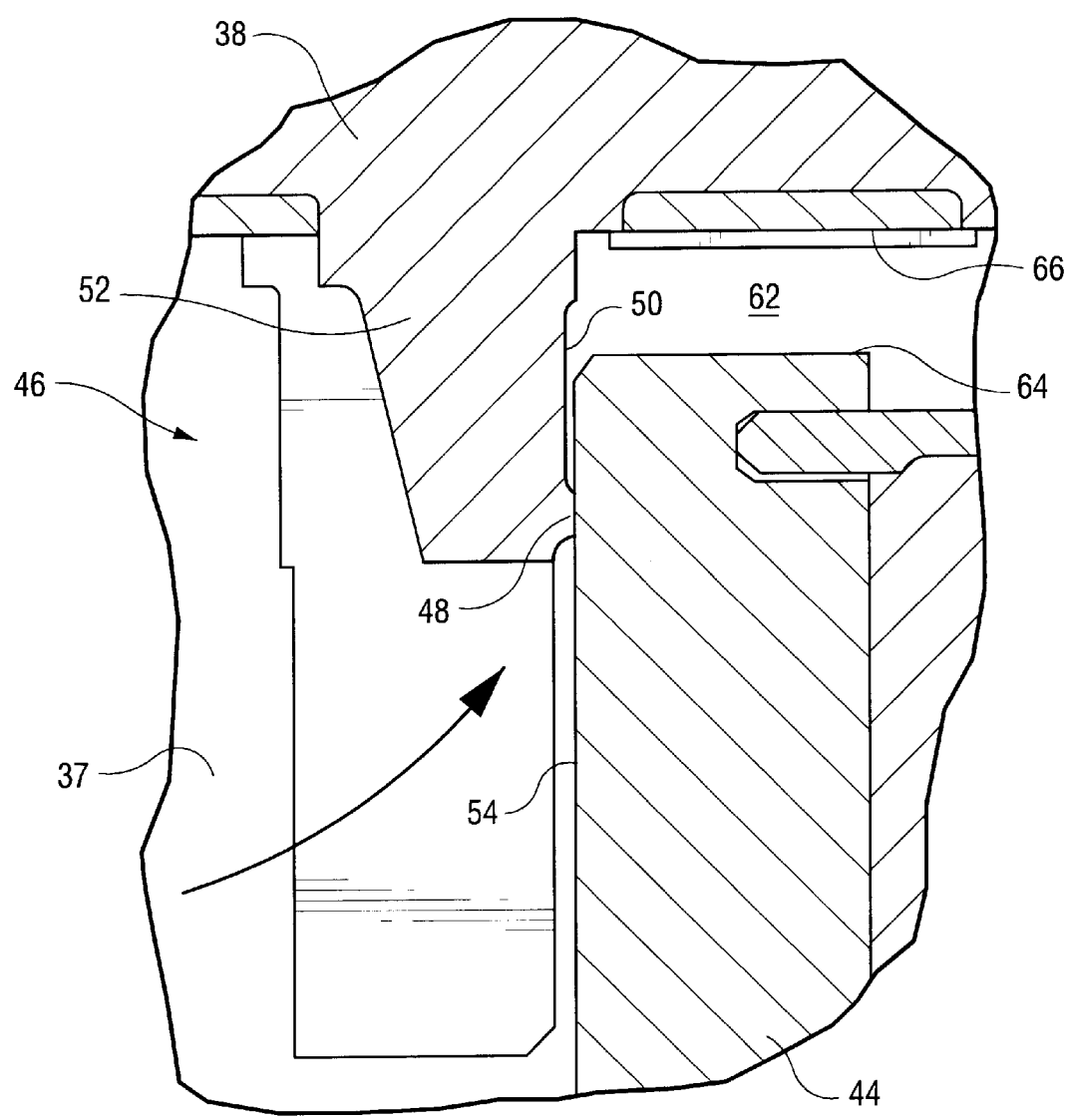
FIG. 2 is an enlarged fragmentary cross-sectional view illustrating a conventional chordal seal hinge.
Figure 3:
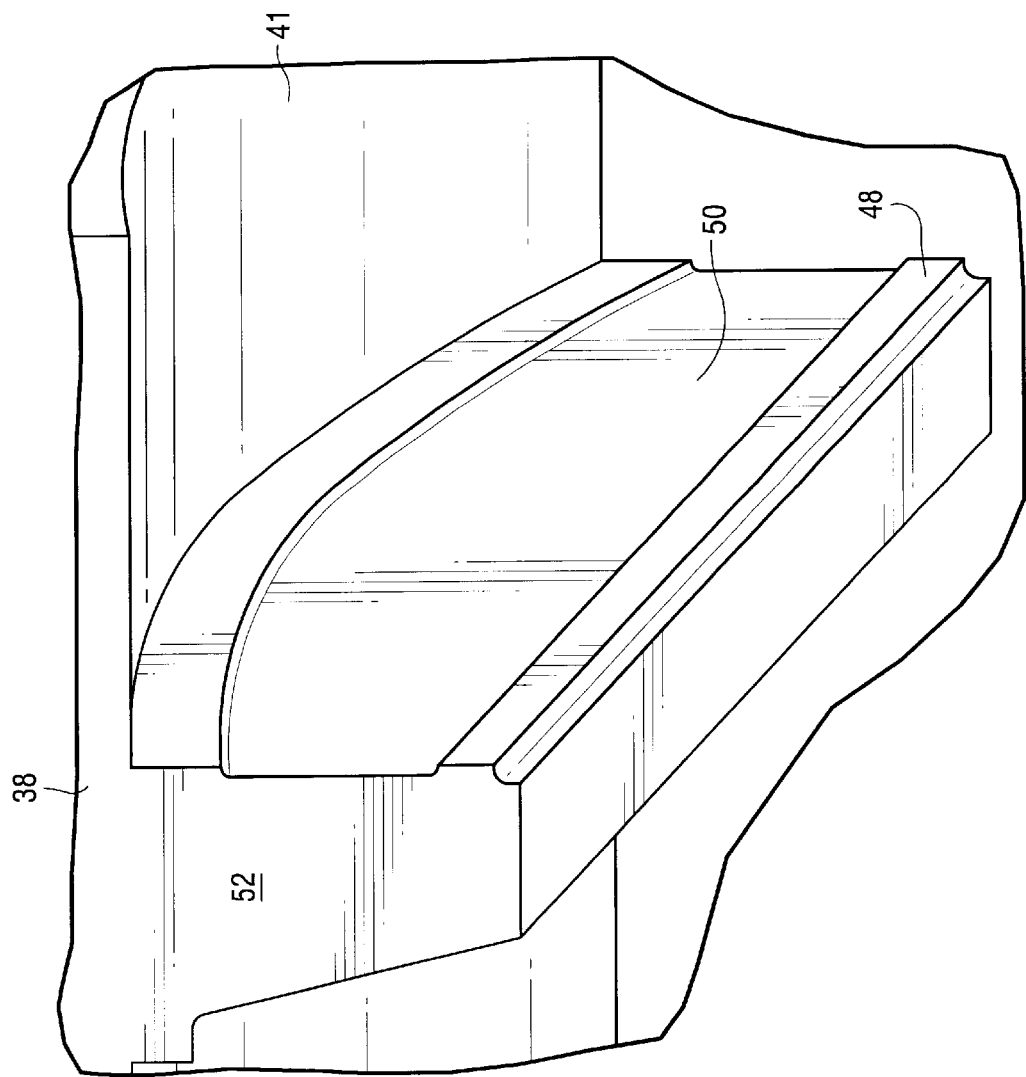
FIG. 3 is a fragmentary perspective view illustrating a portion of a conventional chordal hinge seal along an inner rail of a nozzle segment.
Figure 4:
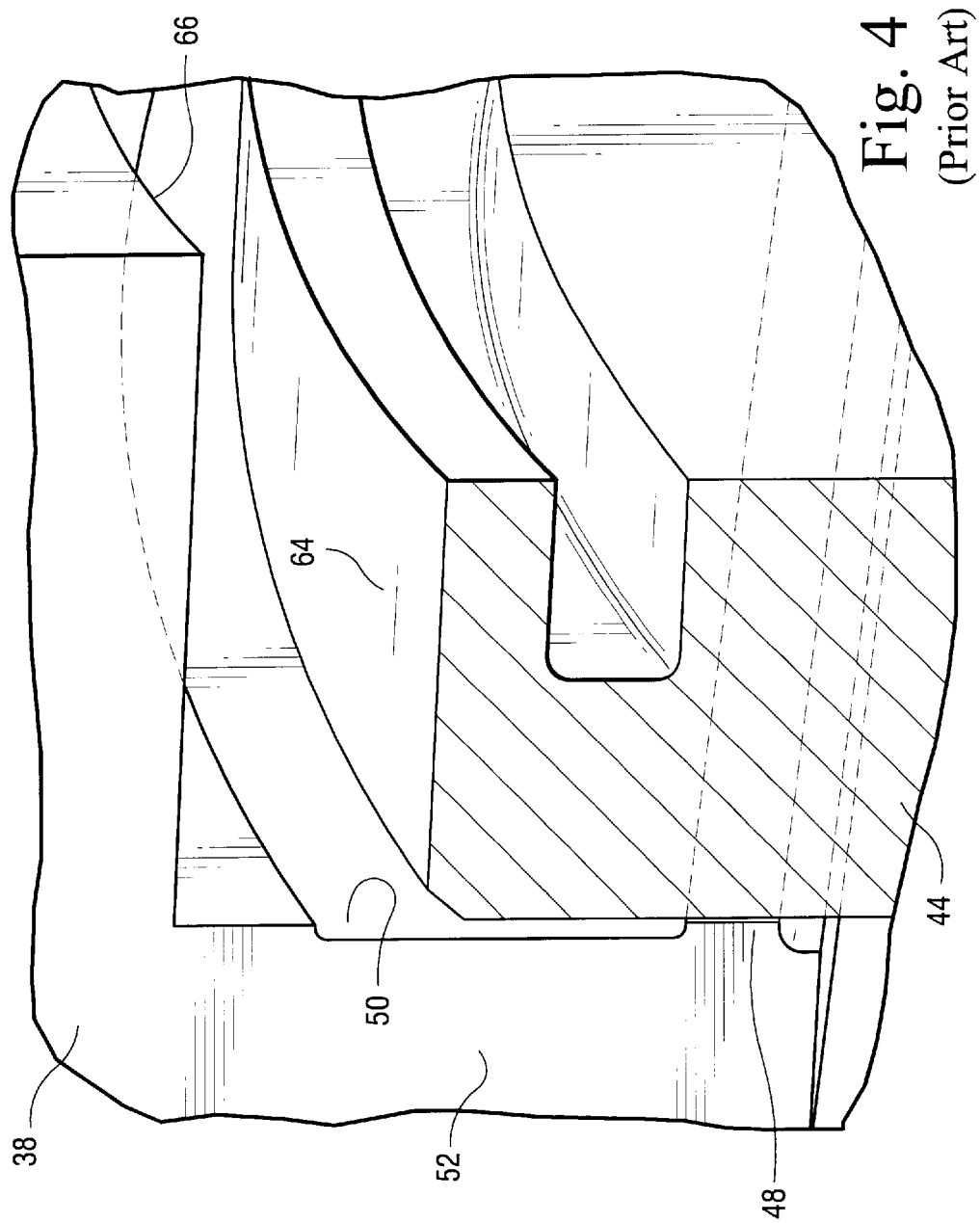
FIG. 4 is a fragmentary perspective view with parts in cross-section illustrating the conventional chordal hinge seal in sealing engagement with a nozzle support ring of the gas turbine.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41 (FIG. 3) each mounting one, preferably two, stator vanes extending between inner and outer band portions and arranged in an annular array of segments. A nozzle retaining ring 42 connected to the turbine casing is coupled to the outer band and secures the first-stage nozzle. A nozzle support ring 44 radially inwardly of the inner band 38 of the first-stage nozzles engages the inner band 38. Particularly, the interface between the inner band 38 and the nozzle support ring 44 includes an inner rail 52 (FIG. 2). The inner rail 52 includes a chord-wise, linearly extending axial projection 48, generally and collectively hereinafter referred to as a chordal hinge seal 46. Projection 48 extends along an axial facing surface 50 of the inner rail 52 which forms an integral part of each nozzle segment and specifically the inner band 38. The projection 48 engages a first annular surface 54 of the nozzle support ring 44. It will be appreciated that high pressure compressor discharge air lies in the region 37 and lower pressure hot gases flowing in the hot gas path 14 lie on the opposite side of the seal 48. The chordal hinge seal 46 thus is intended to seal against leakage from the high pressure region 37 into the lower pressure region of the hot gas path 14.

As noted previously, however, in turbine operation, component parts of the nozzles and nozzle support ring will tend to form leakage gaps between the projection 48 and the surface 54 of the nozzle support ring 44 whereby leakage flow may occur from the high pressure region to the low pressure region. In order to minimize or prevent leakage flow into the hot gas path 14, and in accordance with a preferred embodiment of the present invention, there is provided a supplemental seal for sealing between the first-stage nozzles and the nozzle support ring 44. The supplemental seal, generally designated 70, includes a seal body 71 having a first, generally U-shaped portion 72 in cross-section and a pair of reversely extending, generally U-shaped marginal portions 74 in cross-section along opposite sides of the U-shaped portion 72. In a natural state of the seal body, the laterally outer extremities of the marginal U-shaped portions extend outwardly beyond the lateral extent of the main U-shaped portion 72. Preferably, the seal body 71 is formed of sheet metal. In a particular embodiment hereof, a pair of sheet metal plates 76 and 78 are secured, for example, by welding to one another to form the seal body.

Figure 5:
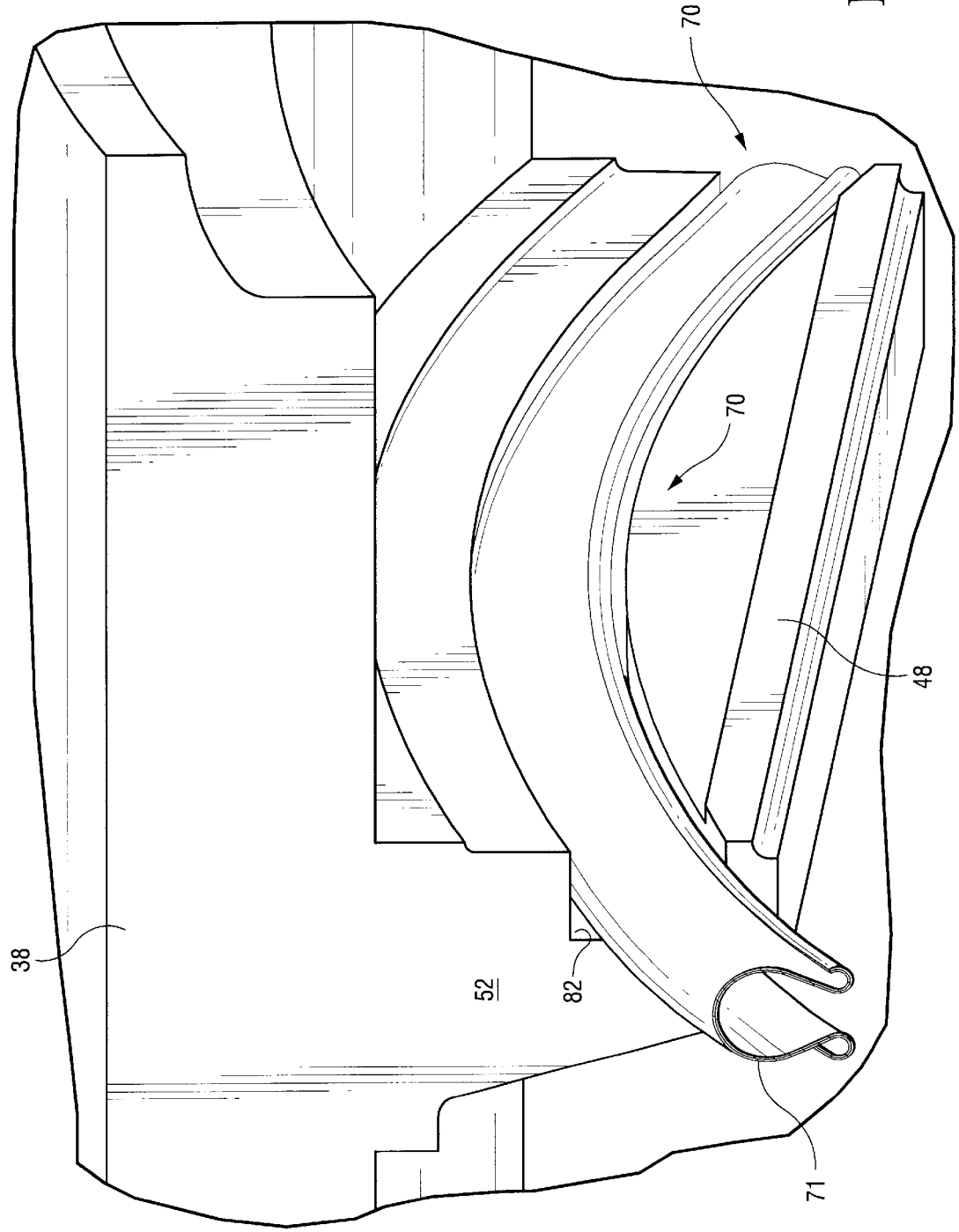
FIG. 5 is a fragmentary enlarged perspective view of an inner rail of a nozzle segment illustrating both the chordal hinge seal and a supplemental seal according to a preferred embodiment of the present invention.
Figure 6:
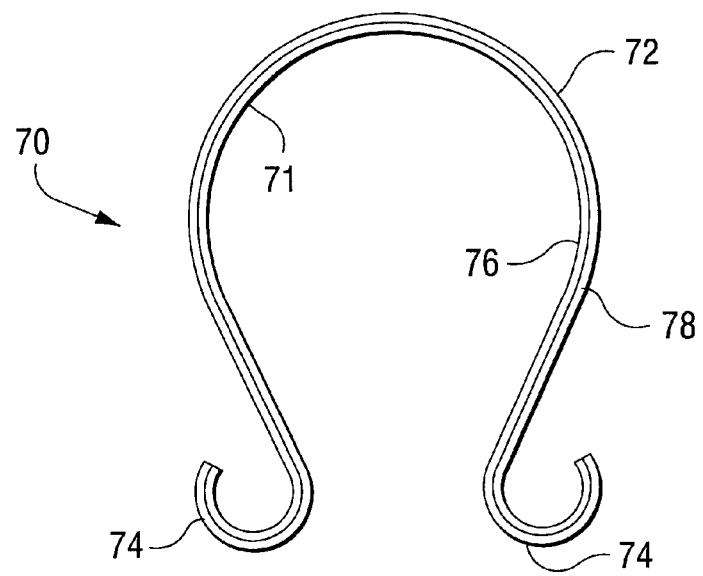
FIGS. 6 and 7 are cross-sectional views of the supplemental seal in its non-compressed and compressed states, respectively.
Figure 7:
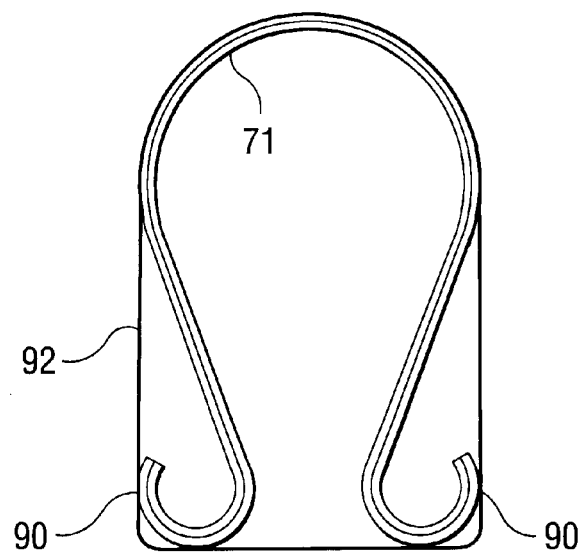
Figure 8:
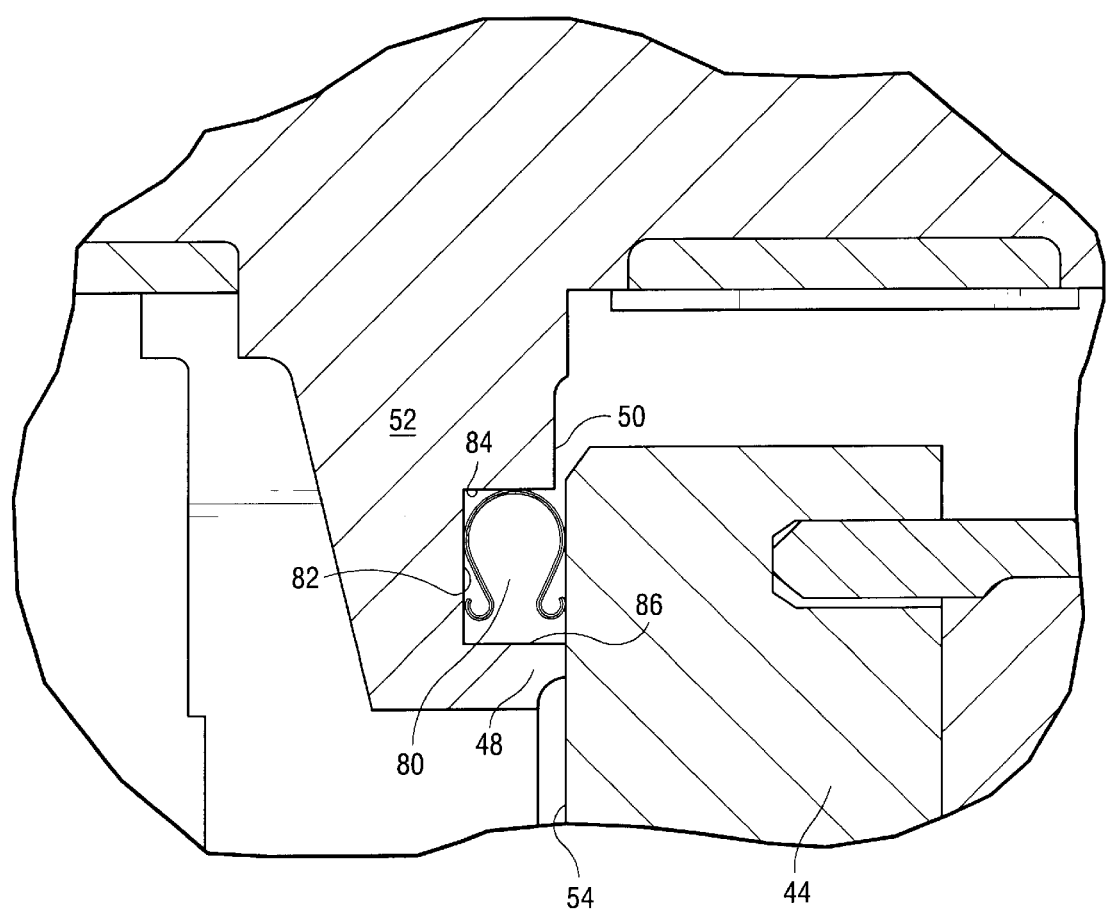
FIG. 8 is a fragmentary enlarged cross-sectional view illustrating the supplemental seal hereof in the cavity released for sealing engagement between opposed sealing surfaces of the nozzle support ring and the nozzle segment.

Referring now to FIGS. 5 and 8, one of the sealing surfaces 50 and 54 of the nozzle segment 52 and the nozzle support ring 44 is provided with a cavity 80 for housing the supplemental seal 70. Preferably, the housing 80 is formed in the inner rail 52 with the cavity 80 opening generally axially toward the axially opposite sealing surface 54 of the nozzle support ring 44. The cavity 80 includes a base 82 and radially opposed surfaces 84 and 86, respectively. As illustrated in FIG. 5, the cavity 80 extends in an arcuate path about the axis of the turbine rotor and lies radially outwardly of the chordal hinge seal 48. Consequently, the supplemental seal 70 is located to substantially preclude any leakage flow past the chordal hinge seal 48 from entering the low pressure region of the hot gas path 14.

To install the supplemental seal, the cavity 80 is first formed in the sealing surface 50 of the inner rail 52. The supplemental seal 70 is provided preferably in arcuate lengths in excess of the arcuate length of the nozzle segments, preferably in 90° or 180° lengths, and therefore spans the joints between the nozzle segments. To install the seal body, the body is first compressed to a configuration which, when inserted into the cavity 80, enables the seal body to lie wholly within the confines of the cavity 80. Means are provided to maintain the seal body in a compressed state during installation. Such means, for example, may comprise a wrap 92 provided about the entire length or portions of the length of each seal section which flexes the marginal portions 74 of the seal toward one another, reducing both the lateral extent of the marginal seals, as well as the lateral extent of the generally U-shaped portion 72 of the supplemental seal. Such wrap may be comprised of Kevlar® 29 and may comprise a continuous wrap or a segmented wrap about sections of the seal. Alternatively, a high-strength plastic such as Lexan™ or Ultem™ clips may hold the seal in a compressed state during assembly. As a further alternative, epoxy may be applied to the margins 74 of the seal when located in the cavity to maintain the supplemental seal in the compressed state.

As the turbine reaches operating conditions, i.e., higher temperatures, the retaining means, e.g., the wrap or wraps or the epoxy, release the seal from its compressed state, enabling the seal to expand in a lateral (axial) direction. Such expansion locates surface portions 90 of the marginal portions 74 into engagement against the base 82 of the cavity 80 and the sealing surface 54 of the nozzle support ring 44. Consequently, the supplemental seal remains biased or pre-loaded into sealing engagement with the opposed sealing surfaces. It will be appreciated that a metal-to-metal line contact with good sealing performance is thus provided to prevent any leakage flow past the chordal hinge seal from entering the hot gas path.

As noted previously, the supplemental seal 70 is preferably provided in segments which have a circumferential extent greater than the circumferential extent of the nozzle segments. Thus, the supplemental seal spans between the joints between adjacent nozzle segments, as illustrated in FIG. 5, with the supplemental seal extending beyond the lateral edge of the nozzle segment. This seals against any leakage path at the joint between the nozzle segments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine comprising:
   a turbine nozzle support ring having a generally axially facing first surface;
   a turbine nozzle segment having at least one stator vane and including an inner band having a second surface in axial opposition to said first surface;
   one of said first and second surfaces defining a cavity opening generally axially toward another of said first and second surfaces; and
   a flexible seal in said cavity including a seal body having a first, generally U-shaped portion in cross-section and a pair of reversely extending, generally U-shaped marginal portions in cross-section along opposite sides of said U-shaped portion, said marginal portions in sealing engagement with an interior surface of the cavity of said one surface and said another of said first and second surfaces, respectively;
   said cavity and said seal body being arcuate in a circumferential direction about an axis of the turbine, one of said support ring and said segment including an axially extending projection along an axial facing surface thereof for engagement with an axially facing surface of another of said support ring and said segment to form a seal therebetween.

2. A gas turbine according to claim 1 wherein said seal body comprises a pair of sheet metal plates secured one to the other, said seal body being biased to maintain said marginal portions in sealing engagement with said interior cavity surface and said another of said first and second surfaces.

3. A gas turbine comprising:
   a turbine nozzle support ring having a generally axially facing first surface;
   a turbine nozzle segment having at least one stator vane and including an inner band having a second surface in axial opposition to said first surface;
   one of said first and second surfaces defining a cavity opening generally axially toward another of said first and second surfaces;
   a flexible seal in said cavity including a seal body having a first, generally U-shaped portion in cross-section and a pair of reversely extending, generally U-shaped marginal portions in cross-section along opposite sides of said U-shaped portion, said marginal portions in sealing engagement with an interior surface of the cavity of said one surface and said another of said first and second surfaces, respectively; and
   means for releasably retaining said seal body in said cavity in a compressed state such that said seal body lies wholly within said cavity, said retaining means releasing said seal body from said compressed state in response to turbine operating conditions.

4. A gas turbine according to claim 3 wherein said retaining means includes a wrap about said seal body.

5. A gas turbine according to claim 3 wherein said retaining means includes an epoxy temporarily maintaining said seal body in said cavity in said compressed state.

6. A gas turbine comprising:
   a turbine nozzle support ring having a generally axially facing first surface;
   a plurality of turbine nozzle segments having an annular array of stator vanes and an annular second surface in axial opposition to said first surface;
   each of said segments including an axial extending projection for sealing engagement with said first surface forming a first seal therewith;
   one of said first and second surfaces having a cavity opening generally axially toward another of said first and second surfaces and at a location radially outwardly of the first seal;
   a flexible seal in said cavity including a seal body having a first, generally U-shaped portion in cross-section and a pair of reversely extending, generally U-shaped marginal portions in cross-section along opposite sides of said U-shaped portion, said marginal portions in sealing engagement with an interior surface of the cavity of said one surface and said another of said first and second surfaces, respectively; and
   means for releasably retaining said seal body in said cavity in a compressed state such that said seal body lies wholly within said cavity, said retaining means releasing said seal body from said compressed state in response to turbine operating conditions.

7. A gas turbine according to claim 6 wherein said retaining means includes a wrap about said seal body.

8. A gas turbine according to claim 6 wherein said retaining means includes an epoxy temporarily maintaining said seal body in said cavity in said compressed state.

* * * * *